Patented May 12, 1942

2,282,327

UNITED STATES PATENT OFFICE 2,282,327

PYROLYSIS OF DIPHENYL-ETHANE COMPOUNDS

Robert R. Dreisbach, Midland, Mich., assignor to The Dow Chemical Company, Midland, Mich., a corporation of Michigan No Drawing. Application August 29, 1939, Serial No. 292,456

7 Claims. (Cl. 260—668)

This invention relates to a process for the catalytic pyrolysis of diphenyl ethanes and their derivatives to form mononuclear aromatic compounds.

An object of the invention is to provide an improved method of pyrolyzing diphenyl ethanes wherein a maximum yield of useful aromatic compounds is obtained with substantial absence of gaseous decomposition products. Another object is to provide a new method of preparing ethyl benzene.

According to the invention, the diphenyl ethanes and their nuclear lower alkyl and halogen derivatives may readily be converted to mononuclear compounds by pyrolysis in the presence of a metal halide catalyst of the Friedel-Crafts type, preferably at a temperature of 200°–350° C. Benzene and ethyl benzene compounds are the major products of the treatment, and may be recovered by fractional distillation.

The pyrolysis may be carried out according to any procedure for contacting the diphenyl ethane compound with the catalyst at the reaction temperature. However, optimum results and maximum yields of ethyl benzene compounds are attained by heating the catalyst, or a suspension thereof in a high-boiling oil, to a temperature of 250°–300° C. in a suitable vessel, continuously dropping the diphenyl ethane compound onto the catalyst at a slow rate, whereby the compound is instantly pyrolyzed and the products are flashed into the vapor state, and continuously withdrawing the vaporous products as they are formed. These vapors may then be condensed and fractionally distilled to separate the desired reaction products.

The nature of the products of pyrolysis depends to a considerable extent upon the diphenyl ethane compound pyrolyzed and the reaction conditions, but usually a mixture of a benzene compound and an ethyl benzene compound is obtained. For example, when as-diphenyl ethane is pyrolyzed, benzene and ethyl benzene are obtained in about equal proportions. With s-diphenyl ethane (dibenzyl), benzene is the chief product, ethyl benzene being formed in smaller quantity; little if any toluene is obtained. When the diphenyl ethane compound contains one or more lower alkyl groups such as the ethyl, isopropyl, or tert.-butyl radicals, or one or more halogens such as chlorine or bromine, in one or both phenyl nuclei, the products of pyrolysis are somewhat more complex, although the nuclear alkyl and halogen radicals are not themselves affected by the treatment. Thus, as-p.p'-dichloro diphenyl ethane (prepared by the Friedel-Crafts synthesis from chlorobenzene and acetylene) is converted chiefly to a mixture of chlorobenzene and p-chloro ethyl benzene, and 3.5.3'.5' tetramethyl dibenzyl (Ber. 32, 2532) to m-xylene and some 3.5 dimethyl ethyl benzene.

The diphenyl ethane compounds pyrolyzed may be either the pure substances, or mixtures essentially comprising the compounds. Such mixtures are frequently obtained as by-products in the industrial alkylation of mononuclear aromatic compounds, and the present process is a useful method of converting them back to mononuclear compounds.

The process of the invention may be conducted in the presence of any metal halide catalyst of the Friedel-Crafts type, aluminum chloride being preferable. The catalyst may be either the metal halide itself, or the sludge-like organo-metal halide complex recovered from a previous treatment. The catalyst is preferably employed in proportions of 1 to 20 parts per 100 parts of diphenyl ethane compound.

The following examples will illustrate the invention but are not to be construed as limiting its scope.

Example 1

A mixture of 522 g. of as-diphenyl ethane and 52 g. of anhydrous aluminum chloride was heated at its boiling point under a reflux condenser for 4.5 hours. The resulting mixture was then cooled, washed with water to remove the catalyst, and then dried. The dried material was then fractionally distilled at atmospheric pressure to separate the products of reaction. The distillate contained 29.4 per cent of benzene, 15.2 per cent of ethyl benzene, 24.6 per cent of unchanged as-diphenyl ethane, and 25.9 per cent of a high-boiling oil, all of which were recovered as separate fractions.

Example 2

An oily hydrocarbon mixture derived as a by-product from the industrial ethylation of benzene, having a boiling point of 271°–274° C., and consisting substantially of as-diphenyl ethane was pyrolyzed according to the invention. A charge of 43 g. of aluminum chloride was heated at a temperature of 270°–280° C. and 215 g. of the hydrocarbon mixture was run slowly onto the heated catalyst. The mixture pyrolyzed almost instantly, the vapor formed being withdrawn, condensed, and fractionally distilled.

The distillate contained 67.2 per cent of benzene, 26.6 per cent of ethyl benzene, and 4.1 per cent of a high-boiling residue. Almost no gas was formed in the treatment.

Example 3

An oily hydrocarbon mixture derived as a by-product from the ethylation of benzene, having a boiling point of 270°–400° C., and consisting of approximately equal parts of as-diphenyl ethane and nuclear ethylated as-diphenyl ethanes was pyrolyzed according to the invention. A charge of 27.5 lbs. of aluminum chloride catalyst sludge from a previous pyrolysis was heated at a temperature of 250°–300° C. and 130 lbs. of the hydrocarbon mixture was run slowly onto the heated catalyst. The mixture pyrolyzed and vaporized almost instantly, and the vapors were withdrawn as formed and condensed, 130 lbs. of condensate being thus obtained. This product was fractionally distilled, whereby 45.8 lbs. of ethyl benzene was recovered, in addition to 29.2 lbs. of benzene, 17.0 lbs. of diethyl benzene, and 28.1 lbs. of unreacted as-diphenyl ethane.

Other modes of applying the principle of the invention may be employed instead of these explained, change being made as regards the details disclosed provided the method stated in any of the following claims, or the equivalent thereof, be employed.

I claim:

1. The method of converting diphenyl ethane compounds into mononuclear aromatic compounds which comprises heating a compound selected from the class consisting of the diphenyl ethanes and their nuclear lower alkyl and halogen derivatives at a temperature between 200° C. and 350° C. in the presence of a metal halide catalyst of the Friedel-Crafts type.

2. The method of converting a diphenyl ethane into a hydrocarbon mixture consisting essentially of benzene and ethyl benzene which comprises heating a diphenyl ethane at a temperature between 200° C. and 350° C. in the presence of a metal halide catalyst of the Friedel-Crafts type.

3. The method of converting as-diphenyl ethane into a hydrocarbon mixture consisting essentially of benzene and ethyl benzene which comprises heating as-diphenyl ethane at a temperature between 200° C. and 350° C. in the presence of a metal halide catalyst of the Friedel-Crafts type.

4. The method of converting as-diphenyl ethane into a hydrocarbon mixture consisting essentially of benzene and ethyl benzene which comprises heating as-diphenyl ethane at a temperature between 200° C. and 350° C. in the presence of aluminum chloride as catalyst.

5. The method of converting as-diphenyl ethane into a hydrocarbon mixture consisting essentially of benzene and ethyl benzene which comprises maintaining an aluminum chloride catalyst of the Friedel-Crafts type at a temperature between 250° C. and 300° C., continuously dropping as-diphenyl ethane onto the heated catalyst, whereby the said diphenyl ethane is pyrolyzed and the products formed are flashed into the vapor state, and withdrawing the said vapor products as they are formed.

6. The method of preparing ethyl benzene which comprises maintaining an aluminum chloride catalyst of the Friedel-Crafts type at a temperature between 250° C. and 300° C., continuously dropping as-diphenyl ethane onto the heated catalyst, whereby the said diphenyl ethane is pyrolyzed, forming a vaporous mixture comprising ethyl benzene, withdrawing the said mixture as it is formed and condensing it, and recovering ethyl benzene from the condensate.

7. The method of preparing ethyl benzene which comprises maintaining an aluminum chloride catalyst of the Friedel-Crafts type at a temperature between 250° C. and 300° C., continuously dropping a mixture of as-diphenyl ethane and ethylated as-diphenyl ethanes onto the heated catalyst, whereby the said diphenyl ethanes are pyrolyzed, forming a vaporous mixture comprising ethyl benzene, withdrawing the said mixture as it is formed and condensing it, and recovering ethyl benzene from the condensate.

ROBERT R. DREISBACH.